US012435545B2

(12) United States Patent
Kölliker et al.

(10) Patent No.: US 12,435,545 B2
(45) Date of Patent: Oct. 7, 2025

(54) LOCKING DEVICE FOR A CLOSURE ELEMENT

(71) Applicant: DORMAKABA SCHWEIZ AG, Wetzikon (CH)

(72) Inventors: Marcel Kölliker, Wetzikon (CH); Franco Di Sario, Wetzikon (CH); Markus Zahner, Wetzikon (CH)

(73) Assignee: DORMAKABA SCHWEIZ AG, Wetzikon (CH)

( * ) Notice: Subject to any disclaimer, the term of this patent is extended or adjusted under 35 U.S.C. 154(b) by 0 days.

(21) Appl. No.: 18/714,971

(22) PCT Filed: Dec. 2, 2022

(86) PCT No.: PCT/EP2022/084201
§ 371 (c)(1),
(2) Date: May 30, 2024

(87) PCT Pub. No.: WO2023/099728
PCT Pub. Date: Jun. 8, 2023

(65) Prior Publication Data

US 2024/0418004 A1 Dec. 19, 2024

(30) Foreign Application Priority Data

Dec. 3, 2021 (EP) .................................... 21212239

(51) Int. Cl.
*E05B 47/06* (2006.01)
*E05B 27/00* (2006.01)
*E05B 47/00* (2006.01)

(52) U.S. Cl.
CPC .......... *E05B 47/063* (2013.01); *E05B 27/001* (2013.01); *E05B 27/0014* (2013.01);
(Continued)

(58) Field of Classification Search
CPC ............... E05B 27/0007; E05B 27/001; E05B 27/0014; E05B 27/0017; E05B 27/0021;
(Continued)

(56) References Cited

U.S. PATENT DOCUMENTS 4,377,940 A * 3/1983 Hucknall ............ E05B 27/0067 70/378
4,807,454 A * 2/1989 Sengupta .............. E05B 47/063 70/277
(Continued)

FOREIGN PATENT DOCUMENTS

CN 1307662 A 8/2001
CN 1685125 A 10/2005
(Continued)

OTHER PUBLICATIONS

International Search Report for International Application No. PCT/EP2022/084201, dated Feb. 8, 2023, 2 pages, English translation.
(Continued)

*Primary Examiner* — Christopher J Boswell
(74) *Attorney, Agent, or Firm* — CANTOR COLBURN LLP

(57) ABSTRACT

A barrier device for a locking device is provided with a stator and with a rotor as two components and with a barrier element. The rotor is mounted in the stator. The barrier element is mounted in a first component of the components and can be moved between a first position and a second position. In the first position, the barrier element engages in a second component of the components. In the second position, the barrier element is disengaged from the second component. The second component has a first contact surface for the barrier element, which moves the barrier element from the first position into the second position when the rotor rotates. The second component further has a second contact surface for the barrier element, which leaves the
(Continued)

barrier element in the first position when the rotor begins to rotate. A locking device is provided with the barrier device.

13 Claims, 5 Drawing Sheets

(52) U.S. Cl.
CPC ...... *E05B 27/0021* (2013.01); *E05B 27/0082* (2013.01); *E05B 47/0619* (2013.01); *E05B 47/0649* (2013.01); *E05B 47/0005* (2013.01)

(58) Field of Classification Search
CPC ............. E05B 27/0082; E05B 47/0619; E05B 47/0626; E05B 47/063; E05B 47/0638; E05B 47/0646; E05B 47/0649
See application file for complete search history.

(56) References Cited

U.S. PATENT DOCUMENTS

| | | | | | |
|---|---|---|---|---|---|
| 5,010,750 | A * | 4/1991 | Boser | E05B 47/063 70/276 |
| 5,699,686 | A * | 12/1997 | Neumayer | E05B 47/063 70/276 |
| 5,839,305 | A * | 11/1998 | Aston | E05B 47/063 70/283.1 |
| 6,442,986 | B1 * | 9/2002 | Russell | E05B 47/0634 70/283.1 |
| 6,826,935 | B2 * | 12/2004 | Gokcebay | E05B 47/063 340/5.2 |
| 6,860,131 | B2 * | 3/2005 | Armstrong | E05B 29/004 70/495 |
| 7,370,502 | B2 * | 5/2008 | Widen | E05B 27/0082 70/495 |
| 7,640,773 | B2 * | 1/2010 | Bellamy | E05B 47/0653 70/416 |
| 8,544,303 | B2 * | 10/2013 | Andersson | E05B 47/063 70/278.3 |
| 10,087,655 | B2 * | 10/2018 | Pankratius | E05B 29/0066 |

FOREIGN PATENT DOCUMENTS

| | | | |
|---|---|---|---|
| CN | 111094677 | A | 5/2020 |
| DE | 102014110857 | A1 | 2/2016 |
| EP | 0324096 | A2 | 7/1989 |
| EP | 1164238 | A1 | 12/2001 |
| EP | 1719861 | A2 | 11/2006 |
| EP | 2886756 | A1 | 6/2015 |
| EP | 1914368 | B1 | 6/2018 |
| FR | 2945065 | A1 | 11/2010 |
| WO | 02088492 | A2 | 11/2002 |
| WO | 03100199 | A1 | 12/2003 |

OTHER PUBLICATIONS

Written Opinion for International Application No. PCT/EP2022/084201, dated Feb. 8, 2023, 3 pages, English translation.

* cited by examiner

LOCKING DEVICE FOR A CLOSURE ELEMENT

CROSS-REFERENCE TO RELATED APPLICATIONS

This application is a 35 U.S.C. § 371 National Stage patent application of PCT/EP2022/084201, filed on 2 Dec. 2022, which claims the benefit of European patent application 21212239.4, filed on 3 Dec. 2021, the disclosures of which are incorporated herein by reference in their entirety.

TECHNICAL FIELD

The disclosure relates to an electromechanical barrier device for a closure element or for a switching element according to the preamble of the independent claim. Such a barrier device is provided with a stator and a rotor as components as well as with a barrier element. The rotor is mounted in the stator. The barrier element is mounted in a first component of the components and can be moved between a first position and a second position. In the first position, the barrier element engages in a second component of the components. In the second position, the barrier element is disengaged from the second component. The second component has a first contact surface for the barrier element, which moves the barrier element from the first position into the second position when the rotor rotates. Furthermore, the disclosure relates to a locking device equipped with such a barrier device. Locking devices are available in numerous designs, for example in the form of a locking cylinder.

BACKGROUND

EP 1 914 368 B1 discloses a locking cylinder with a barrier element which is located in a first position both in a rotor and in a stator and thus blocks a rotation of the rotor with respect to the stator. In a second position of the barrier element, however, the barrier element is fully in the rotor, such that the rotor can rotate with respect to the stator. To move from the first position into the second position, a blocking element in the rotor is rotated from a blocking position into a release position. In the release position, the blocking element allows the movement of the barrier element from the first position into the second position. The movement of the barrier element is caused by inclined contact surfaces in the stator, which push the barrier element into the second position when the rotor rotates. In order to ensure that the barrier element remains spaced apart from the blocking element in the first position, a magnet is provided which holds the barrier element in the first position. The disadvantage of this is that when the rotor moves, the barrier element is always pressed against the blocking element by the contact surfaces. This may cause damage to the blocking element and the barrier element.

SUMMARY

The disclosure therefore further develops a generic barrier device such that the risk of damage to the barrier device, in particular the blocking element and/or the barrier element, is at least reduced during operation. In particular, a locking device provided with such a barrier device is to be created.

This is achieved by the limitations provided in the independent claim. Advantageous further developments of the device are indicated in the dependent device claims, the description and in the figures. Furthermore, the advantage is also achieved by providing a locking device according to the claims. Advantageous further developments of the locking device are indicated in the description and in the figures. Features and details, which are described in connection with the barrier device according to the disclosure, also apply here in connection with the locking device according to the disclosure and vice versa. In this case, the features mentioned in the description and in the claims may each be essential to the disclosure individually by themselves or in combination.

According to the disclosure, a barrier device is provided with a stator and a rotor as components and a barrier element. The rotor is mounted, in particular rotatably, in the stator. The barrier element is mounted in a first component of the components and can be moved between a first position and a second position. In the first position, the barrier element engages in a second component of the components. In the second position, the barrier element is disengaged from the second component. The second component has a first contact surface for the barrier element, which moves the barrier element from the first position into the second position when the rotor rotates. According to the disclosure, the second component has a second contact surface for the barrier element, which leaves the barrier element in the first position in which the barrier element is located in the engagement position with the second component.

Thus, when the barrier element is in contact with the second contact surface, it is preferably free from forces that could press the barrier element against another element, in particular against a blocking element. This reduces the risk of damage to the barrier element or the blocking element.

The first component can correspond to the rotor or the stator. Accordingly, the second component corresponds to the other of the components, i.e. either the stator or the rotor. Thus, either the barrier element can be mounted in the rotor and engage with the stator in the first position, or the barrier element is mounted in the stator and engages with the rotor in the first position. The bearing of the barrier element is preferably a linear guide.

In the first position, the barrier element prevents a rotation of the rotor in the stator. In this case, preventing a rotation means preventing a relevant range of rotation, e.g. in order to be able to unbolt a closure element. In the second position, the barrier element allows a rotation of the rotor in the stator.

Since the barrier element remains in the first position when it rests on the second contact surface, a further rotation of the rotor with respect to the stator is prevented. Since the second contact surface leaves the barrier element in the first position, if an attempt is made to rotate the rotor, the rotation of the rotor is stopped when the barrier element comes into contact with the second contact surface. In this case, no force is exerted by the second contact surface on the barrier element in the direction of the first position.

The barrier device is preferably used to bolt a spatial area. In particular, the spatial area is fixed. For example, the spatial area can be a room in a building, for example an office, an apartment or a house, or a storage room, for example a cupboard, a mailbox, a chest, a box, a safe or a drawer. In particular, the barrier device serves to be inserted into a particularly door-like closure element, for example a front door, an apartment door, a room door, a cupboard door, a mailbox flap or the front of a drawer, or to be attached to a closure element. Preferably, the stator of the barrier device is at least indirectly connected to the closure element in a rotationally fixed manner.

The barrier device can have a driver or be connectable to a driver. A rotation of the rotor of the barrier device is used to rotate the driver.

The driver is preferably designed as an eccentric. The driver can be designed as a locking lug. It may be that a rotation of the driver in a first direction serves to transfer the closure element from an unbolted state to a bolted state. It may be that a rotation of the driver in a second direction serves to transfer the closure element from a bolted to an unbolted state. For example, the barrier device can be inserted at least indirectly into a mortise lock. In this case, turning the driver can cause the bolt of the mortise lock to move. For example, the rotation of the driver in a first direction can cause the bolt to extend and thus bring about the bolted state of the closure element. For example, a rotation of the driver in a second direction can cause the bolt to retract and thus bring about the unbolted state of the closure element.

Alternatively, the driver itself can act as a bolt. For example, the rotation of the driver in a first direction can cause the driver to assume a bolting position. The rotation of the driver in a second direction, for example, causes the driver to assume an unbolting position.

In a preferred embodiment, the barrier device is designed as an installation device. The installation device is designed to be inserted into a locking device housing of a locking device. Preferably, the installation device is fastened in the locking device housing in a rotationally fixed manner by means of a fastening element. Thus, in the assembled state of the locking device, the stator of the barrier device and the locking device housing form a common fixed unit. The locking device housing is used in particular for insertion into or attachment to the closure element. The locking device can be designed, for example, as a locking cylinder, in particular as a double cylinder or half cylinder, as a knob cylinder, as a furniture cylinder or as a padlock.

The barrier device, in particular the rotor, can be connected or connectable to a knob or a key in order to transmit a mechanical torque to the rotor.

If the barrier device is designed as an installation device, it is preferably provided that the barrier device comprises a connecting section in order to be connected to a driver.

Alternatively, it can be provided that the barrier device itself can be designed as a locking cylinder, in particular as a double cylinder or half cylinder, as a knob cylinder, as a furniture cylinder or as a padlock. The stator is also used here as a housing for insertion into or attachment to the closure element.

Alternatively, the barrier device can be provided for a switching element. This means that the switching element can only be operated by authorized users. The driver can be used here to actuate a switch or button. Thus, the barrier device can be used in a switching element, in particular in a key switch, or can correspond to a key switch.

The electromechanical barrier device comprises in particular an electromechanical actuator, in particular an electric motor. The actuator is used to enable the barrier element to be moved into the second position.

The barrier device can comprise an electronic control device, in particular a processor and/or a controller, to control the actuator. The control device can comprise an electronic memory.

The barrier device can comprise a transmission device. The transmission device can be designed as a transmitting and receiving unit, as a biometric sensor, as a keypad for inputting a PIN and/or as a contact element for making electrical contact with an in particular electronic key. The transmitting and receiving unit can be designed to communicate with a mobile unit, in particular a mobile telephone or a card, by wireless near-field communication, in particular RFID or Bluetooth Low Energy.

The transmission device can be used to send and/or receive electronic data that make it possible to determine a user's authorization to unbolt the spatial area or to actuate the switching element. For example, the transmission device can receive an authorization code and/or an authorization time window, which is verified by the control device. If the verification is completed with a positive result, the actuator can be controlled to allow the barrier element to move into the second position.

Alternatively, the transmission device can receive an opening command, based on which the barrier element is electromechanically moved into the second position or the movement into the second position is released electromechanically. The transmission device is used in particular additionally or alternatively to transmit electrical energy to the barrier device. The electrical energy can be provided for actuating the actuator and/or the control device.

Preferably, the barrier device according to the disclosure comprises a blocking element. The barrier device can comprise an electromechanical actuator assembly with the blocking element and the actuator.

It is preferably provided that the blocking element allows the movement of the barrier element from the first position into the second position in a release position and prevents the movement of the barrier element from the first position into the second position in a blocking position. The actuator is preferably used to enable a movement of the blocking element from the blocking position into the release position. The actuator can thus move the blocking element into the release position and/or, for example, cause the blocking element to move into the release position by tensioning a spring.

In particular, it can be provided that when the blocking element is in the release position, the rotation of the rotor enables, in particular brings about, a movement of the barrier element into the second position. In particular, the first contact surface hereby pushes the barrier element into the second position.

The second contact surface is in particular designed in such manner that the barrier element is spaced apart from the blocking element by the contact with the second contact surface. This can prevent damage to the barrier device.

The blocking element and the barrier element can be spaced apart from one another in the first position of the barrier element, in particular when the barrier element is unloaded and/or when the barrier element rests on the second contact surface.

Preferably, the actuator assembly comprises the electromechanical actuator.

It can be provided that the blocking element is arranged on the output shaft of the actuator designed as an electric motor. Preferably, the actuator enables a rotation of the blocking element from the blocking position into the release position. For example, the actuator rotates the blocking element from the blocking position into the release position. This allows for a very space-saving design.

In particular, because the second contact surface separates the barrier element from the blocking element, it is possible to mount the blocking element on one side. This means that the output shaft can only be mounted on one side in the actuator. Forces acting from the barrier element on the blocking element can be diverted on one side, in particular via the output shaft.

In particular, in order to space the blocking element and the barrier element when they rest on the second contact surface, the barrier element can comprise a projecting head surface. The second contact surface can be designed to correspond thereto. The head surface and the second contact surface are designed in such manner that when the barrier element rests on the second contact surface, the second contact surface is located between the head surface and the blocking element.

Alternatively or additionally, the movement of the barrier element between the first and the second position defines a movement direction, with the head surface and the second contact surface being formed inclined to the movement direction of the barrier element. This allows forces acting on the barrier element to be directed into the stator.

Preferably, the blocking element comprises a recess in which the barrier element is arranged in the second position. In the first position, however, the barrier element is outside the recess. In the release position, the blocking element is arranged such that the recess is located opposite the barrier element such that the barrier element can retract into the recess.

The blocking element can, for example, be disc-shaped.

Preferably, the second component comprises a component element which has the first contact surface and is movably mounted in the remaining second component. In particular, this can ensure that the barrier element comes into contact with the second contact surface as a result of a movement of the component element. The component element preferably has no fixed connection or bearing to the first component.

It can be provided that the component element and the barrier element move relative to each other when the rotor rotates. In the release position of the blocking element, the barrier element is moved from the first position into the second position. In the blocking position of the blocking element, the component element is moved such that the barrier element comes to rest on the second contact surface.

It can be provided that the component element can be moved between a first position and a second position. In the first position, the first contact surface rests on the barrier element in such manner that when the rotor rotates, the barrier element is moved from the first position into the second position. In the second position of the component element, the barrier element comes into contact with the second contact surface in such manner that the barrier element remains in the first position. That is to say that the component element must first be moved into the desired second position during the aforementioned rotation so that the second contact surface can become effective. This enables a targeted initiation of the movement of the barrier element from the first into the second position or a targeted remaining in the first position.

At least one barrier element recess is defined between the at least one first component element and the at least one second component element, in which the barrier element is arranged in the first position. The rotation of the rotor is prevented in particular by engagement of the barrier element in the barrier element recess in the first position of the barrier element. In the second position, the barrier element is located outside the barrier element recess.

In the first position of the component element, the first contact surface is located closer to the barrier element than the second contact surface. The first contact surface delimits the barrier element recess in the first position of the component element. In the second position of the component element, the second contact surface protrudes further into the barrier element recess than the first contact surface.

If a plurality of barrier element recesses are provided, e.g. so that the barrier element can return to the first position from a rest position after a rotation of the rotor over a rotation angle range of the rotor of less than 360°, the barrier element recesses are preferably each surrounded by first contact surfaces and second contact surfaces, as described for a barrier element recess.

The movement of the component element between the first position and the second position preferably comprises a perpendicular component to the movement of the barrier element between the first position and the second position. In particular, the movement of the component element between the first and the second position occurs perpendicular to the movement of the barrier element from the first position into the second position.

The second component can comprise at least one spring element which pushes the component element into the first position, with the spring element being mounted in the second component. This automatically returns the component element to the first position, which enables easier movement control.

Preferably, the barrier element is preloaded into the first position by a spring.

It is preferably provided that the force acting on the barrier element through the spring is smaller than the force acting on the component element through the spring element. It may be that the spring constant of the spring is smaller than the spring constant of the spring element. This allows the spring element to keep the component element in the first position when the barrier element can move into the second position.

Preferably, the barrier element is arranged between at least one first component element and at least one second component element. Thus, both when the rotor rotates clockwise and counterclockwise, the barrier element is moved by the first contact surface into the second position, provided that the blocking element allows the movement into the second position.

It can be provided that the at least one first component element and/or the at least one second component element rest on the barrier element in the first position.

Preferably, the barrier element is arranged between second contact surfaces. Thus, both when the rotor rotates clockwise and counterclockwise, the barrier element is moved against a second contact surface if a movement of the barrier element into the second position is prevented in particular by the blocking element.

Preferably, the first component is designed as the rotor and the second component as the stator. Thus, the barrier element is movably mounted in the rotor and engages in the barrier element recess of the stator in the first position.

Preferably, the barrier element is located in the rotor. The stator comprises the component element. In this case, the component element is designed as a stator element. In this case, the barrier element is rotated with the rotor. However, the component element is not rotated with the rotor. The component element remains in the stator when the rotor rotates. By mounting the component element in the stator, the component element is preferably movable in a predetermined area in the stator. The area itself, however, is preferably stationary.

In particular, if the second component is designed as a stator, the stator preferably comprises a stator body and/or at least one stator insert element. This can simplify assembly.

The stator body can comprise a stator recess accessible from the outer circumference into which the stator insert element can be inserted.

Preferably, the stator insert element comprises the second contact surface.

It can be provided that the stator insert element comprises a guide surface for the stator element, preferably for the first and the second stator element.

In particular, the stator can comprise a cover. The remaining stator, in particular the stator body, the stator insert element and/or the stator element is/are inserted into the cover.

It can be provided that the rotor comprises at least one first axial section, in particular a first rotor element, and a second axial section, in particular a second rotor element. The second section preferably comprises a smaller diameter than the first section.

It can be provided that the barrier element is arranged in the second axial section. This provides sufficient installation space in the stator to accommodate the first and second contact surfaces. Preferably, sufficient installation space is provided in the stator to accommodate the stator element or elements.

In all of the above-mentioned configurations, the first contact surface and the second contact surface can be arranged axially one behind the other in relation to the rotor axis. In particular, the first contact surface axially encloses the second contact surface. Thus, in each direction of rotation, a second contact surface is provided, which is enclosed by a plurality of first contact surfaces. This allows the barrier element to be moved evenly.

Preferably, the barrier element comprises a first contact section for contacting the first contact surface and a second contact section for contacting the second contact surface. The first contact section and the second contact section are thereby preferably rigidly connected to each other. The first contact section and the second contact section are preferably arranged one behind the other in the axial direction. This allows for a simple design of the barrier element.

The first contact section can be designed to correspond to the first contact surface such that the first contact section and the first contact surface can lie flat on one another.

The second contact section can be designed to correspond to the second contact surface such that the second contact section and the second contact surface can lie flat on one another.

It can be provided that the barrier element extends in such manner that the barrier element can only come into contact with the second contact surface by the rotation of the rotor. For example, it is not necessary to displace the barrier element axially to the rotor axis in order for the barrier element to come into contact with the second contact surface.

It can be provided that the barrier element extends in the axial direction in relation to the rotor axis preferably in such manner that the barrier element can come into contact with both the first contact surface and the second contact surface.

The barrier element recess comprises a first side with which the barrier element comes into contact when the rotor rotates to the right, and a second side with which the barrier element comes into contact when the rotor rotates to the left, with the first and second contact surfaces being provided on the first side and on the second side.

Preferably, the barrier element comprises a third contact section for contacting the blocking element, in particular for engaging into the blocking element. The third contact section is preferably rigidly connected to the first contact section and/or the second contact section.

In particular, the barrier device can comprise a latching element for latching in at least one position of the rotor with respect to the stator. The latching element holds the rotor in a position in which the barrier element is not pushed from the first contact surface to the blocking element. This ensures that the barrier element is held securely in this position and cannot leave this position unintentionally.

In all of the variants mentioned, the barrier element can be designed in one piece.

Furthermore, according to the disclosure, a locking device is provided which is equipped with the barrier device according to the disclosure. The barrier device is designed as an installation device.

BRIEF DESCRIPTION OF THE DRAWINGS

The disclosure will be described below in more detail on the basis of exemplary embodiments. Technical features with identical functions are provided with identical reference numerals in the figures. They show.

DETAILED DESCRIPTION OF THE DRAWINGS

Figure 1:
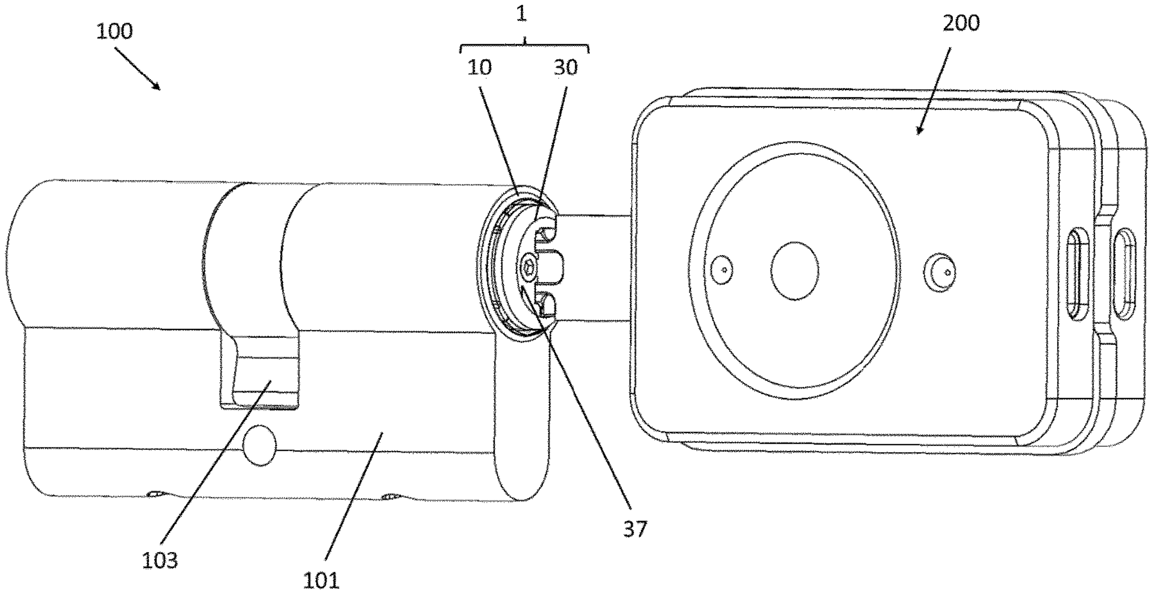
FIG. 1 a locking device according to the disclosure and a key.

FIG. 1 shows a locking device 100 in the form of a locking cylinder, as is known to be used in mortise locks in order to unbolt a building door as a closure element or to bolt it by means of a bolt. For this purpose, the locking device 100 has a housing 101 with a recess in which a driver 103, which is designed as a locking lug, is rotatably arranged. The driver 103 is used to move a bolt in the bolting or unbolting direction.

In the right half of the housing 101 is inserted a barrier device 1 designed as an installation device according to one exemplary embodiment of the disclosure. The installation device 1 comprises a stator 10 in which a rotor 30 of the installation device 1 is inserted so as to be rotatable about a rotor axis 35, which, for example, coincides with the axis of rotation of the driver 103. The rotor 30 comprises, on its front side 37 facing away from the driver 103, a key channel 36 for inserting a shaft of a key 200. The key 200 carries an electronic secret locking code in the form of electronic data. The secret locking code can be used to determine a user's authorization to unbolt the door. The key 200 is preferably designed without a mechanical coding. Therefore, only the electronic secret locking code can be used to determine whether or not the user has authorization. The keys and the barrier devices can be mechanically identical to each other.

Figure 2:
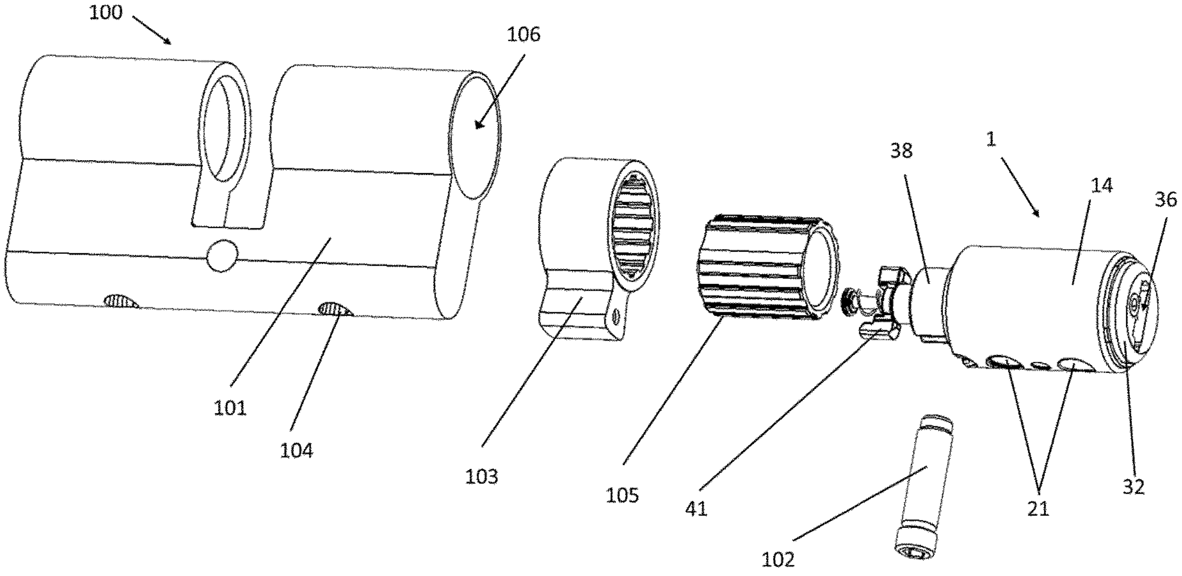
FIG. 2 the locking device from FIG. 1, which is partially disassembled, with a perspective view of a barrier device according to the disclosure, which is designed as an installation device, FIG. 3 the barrier device according to the disclosure from FIG. 2 without cover, FIG. 4 the barrier device from FIG. 3 without cover and stator body in an exploded representation, FIG. 5, 6, 7 selected elements of the installation device from FIG. 4, FIG. 8 a principle representation of the angle of inclination of a first and second contact surface of the barrier device according to the disclosure and FIG. 9 a barrier device according to the disclosure in accordance with a second exemplary embodiment in a partially dismantled state.

FIG. 2 shows the locking device 100 partially disassembled. The housing 101 has, for example in both halves of the recess for the driver 103, openings 104 in the lower area, of which the right opening is provided with a reference numeral. The openings 104 here extend perpendicular to the axis of rotation of the driver 103. The driver 103 has, for example, an inner contour that is not circular in cross-section, for example in the form of an internal toothing, into which an insert 105 preferably engages in a form-fitting manner. For this purpose, the insert 105 has an outer contour that is preferably complementary to the inner contour of the driver 103, here in the form of an external toothing, such that both parts 103, 105 are arranged in a rotationally fixed manner with respect to each other.

A connecting section 38 of the installation device 1 projects into the insert 105. In the connecting section 38, a coupling part 41 is arranged in a guide 42 so as to be slidable. The coupling part 41 is made up of a plurality of parts. Depending on the position of the coupling part 41, the coupling part 41 can establish or release an operative connection between the rotor 30 and the driver 103, in particular via the insert 105. For this purpose, the coupling part 41 of the locking device 100 can engage in a form-fitting manner into an inner contour of the insert 105 not represented. The guide 42 preferably forms a linear guide for the coupling part 41 such that the coupling part 41 is arranged to be movably guided along the rotor axis 35 of the rotor 30.

The installation device 1 has a cover 14 with which the installation device 1 is inserted into an associated insertion opening 106 of the housing 101. A fastening element 102 in the form of a screw is screwed through the recess 104 on the right here from the underside of the housing 101 and into an opening 21 of the cover 14 of the stator 10 on the left here and of a stator body 11 of the stator 10, which will be explained in more detail later. The screw 102 thus fixes the stator 10 in the housing 101. Furthermore, the key channel 36 for inserting the key 200 is designated here, which is formed in a first rotor element 32 of the rotor 30.

Figure 3:
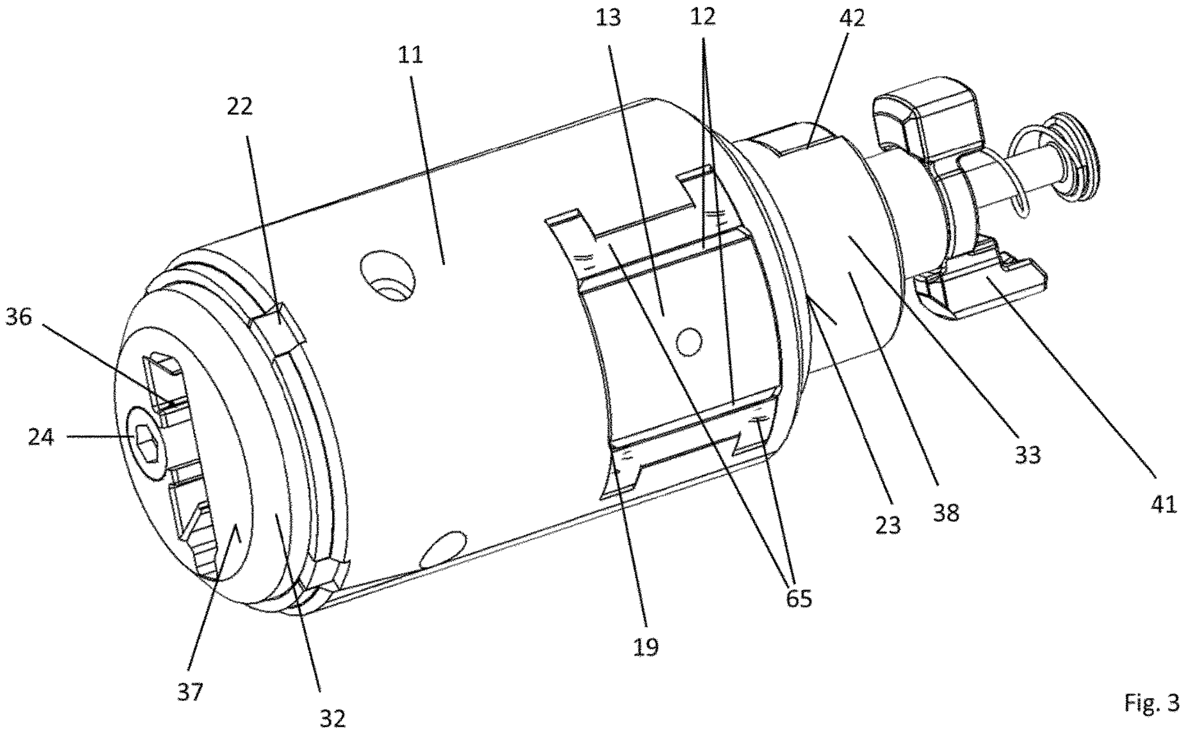

FIG. 3 shows the installation device 1 without cover 14. The stator body 11 is also designed in the manner of a sleeve, but has functional structures inside. The stator body 11 has a stator recess 19 into which a stator insert element 13 is inserted. Component elements 12, which will be explained in more detail later, are attached or arranged on a side of the stator insert element 13 facing the interior of the stator body 11. The component elements 12 are movably mounted on the stator insert element 13 and the stator body 11. The component elements 12 remain in the remaining stator 10 when the rotor 30 rotates. Thus, the component elements 12 are designed as stator elements 12.

The rotor 30 comprises the first rotor element 32 and a second rotor element 33.

The rotor 30 is freely rotatable in the stator body 11 of the stator 10, but is mounted stationary in the direction of its rotor axis 35, which runs parallel to the insertion direction of the key 200 into the key channel 36. The coupling part 41 is arranged in a rotationally fixed manner on the second rotor element 33 of the rotor 30 of the installation device 1. Both rotor elements 32, 33 are reversibly detachably fastened to each other, for example by means of a screw 24, and arranged to be freely rotatable in the stator body 11.

The second rotor element 33 has the guide 42 into which the coupling part 41 engages and is thus arranged in a rotationally fixed manner in relation to the second rotor element 33. The second rotor element 33 is inserted into the stator body 11 from a base side 23 of the stator 10, preferably without the first rotor element 32 during assembly.

Figure 4:
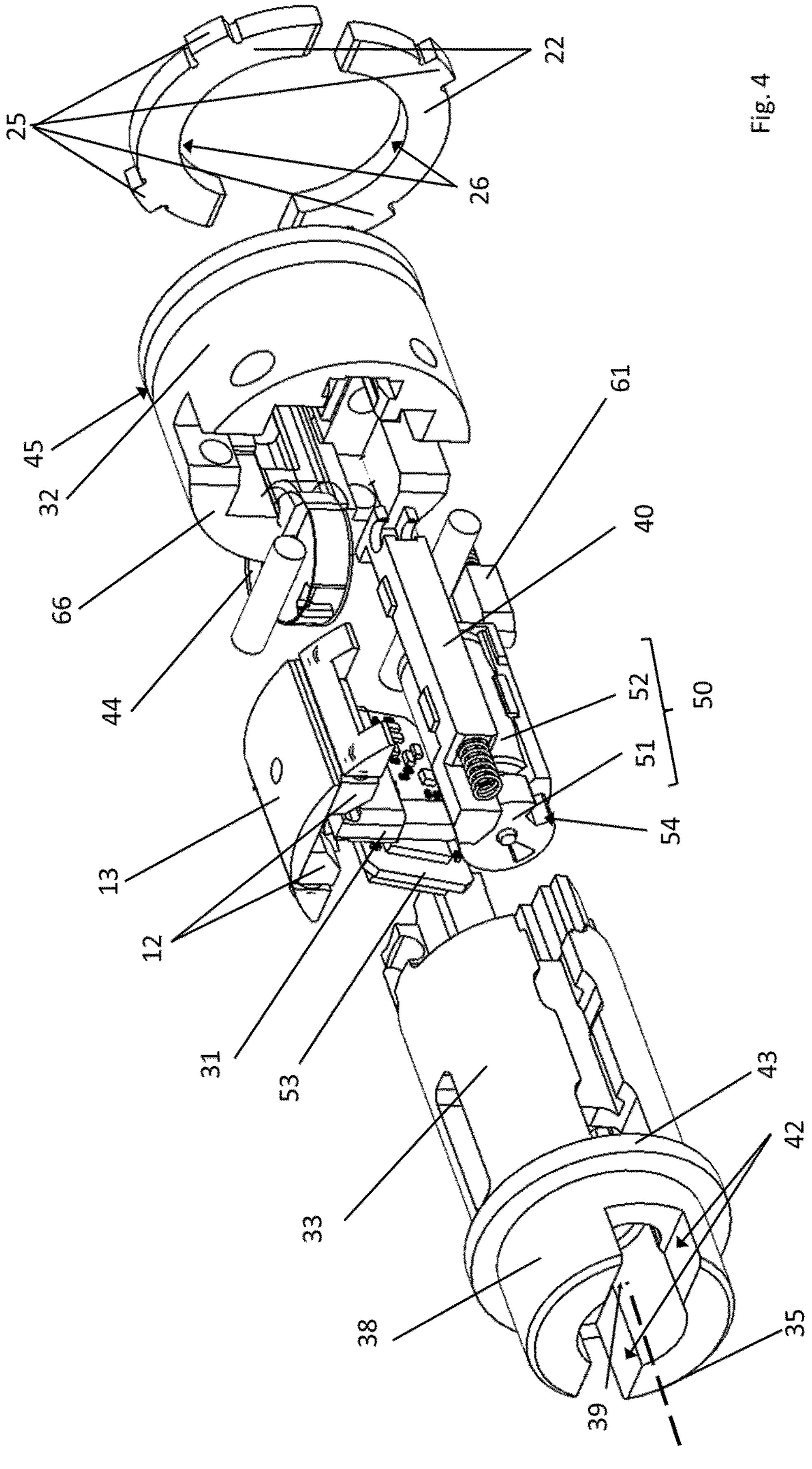

FIG. 4 shows the installation device 1 without cover 14, stator body 11 and coupling part 41 in partially dismantled state.

An extension element 40 is intended to interact mechanically with the key 200. If the key 200 is inserted into the key channel 36, it moves the extension element 40 axially or parallel to the rotor axis 35 upon contact. This allows the extension element 40 to extend the effective range of the key 200. The key and thus the key channel 36 can thereby have a small depth. For example, the key channel 36 can be limited to the first rotor element 36.

The extension part 40 thereby moves the coupling part 41 away from the rotor 30 in the direction of the driver 103 such that the coupling part 41 can come into rotational engagement with the driver 103. A passage 39 is provided in the connecting section 38 such that the extension element 40 can come into contact with the coupling part 41. Either the extension element 40 or the coupling part 41 can protrude through the passage 39 here.

A transmission element 44, here for example in the form of a coil, is provided to establish a data and/or energy transmission connection with the key 200. This makes it possible to read electronic data, for example authentication information or an opening command, from the key 200 or to receive it from the key 200. An electronic control device 53 is coupled to the coil in order to read out the data and, if necessary, evaluate it. If the check of the control device 53 shows that the user of the key 200 is authorized to open the associated door and/or if the control device 53 has an opening command, an electromechanical actuator assembly 50 will be activated. The actuator group 50 comprises an electromechanical actuator 52, here in the form of an electric motor, on whose output shaft a blocking element 51 is arranged in a rotationally fixed manner. The blocking element 51 comprises a recess 54, which will be explained in more detail later.

A barrier element 31 is mounted in the second rotor element 33 preferably perpendicular to the rotor axis 35, so as to be movable towards and away from the blocking element 51. In the first position shown here, the barrier element 31 is located in a barrier element recess 15 (see FIG. 5), which is formed by the stator insert element 13 and the stator elements 12. This prevents the second rotor element 33 and thus the coupling part 41 from being rotated. Turning the inserted key 200 to unbolt the corresponding lock is blocked or prevented. In a second position of the barrier element 31 not represented, the barrier element 31 is disengaged from the barrier element recess 15 of the stator 10. This makes it possible to rotate the rotor 30 in the stator 10 and thus the driver 103.

The barrier element 31 is pushed into the first position by at least one spring 34 (see FIG. 5), preferably a plurality of springs 34. In the exemplary embodiment of FIG. 5, a plurality of springs 34 are provided.

Figure 5:
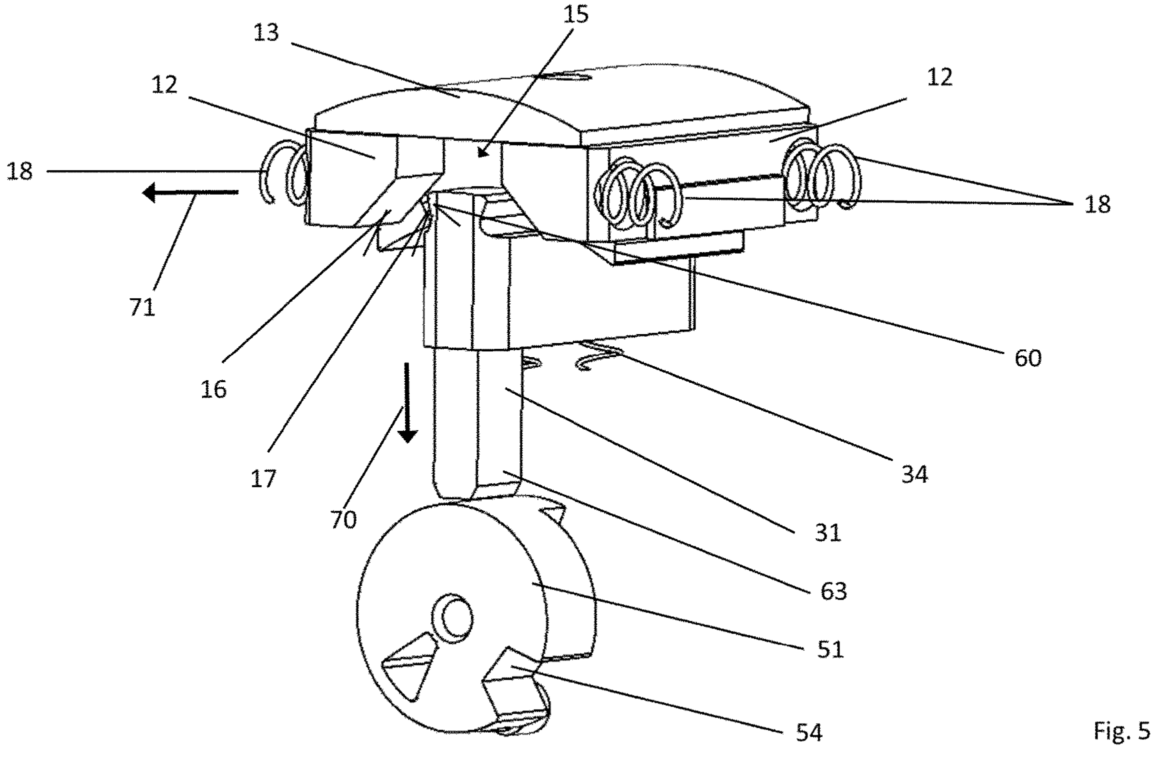
Figure 6:
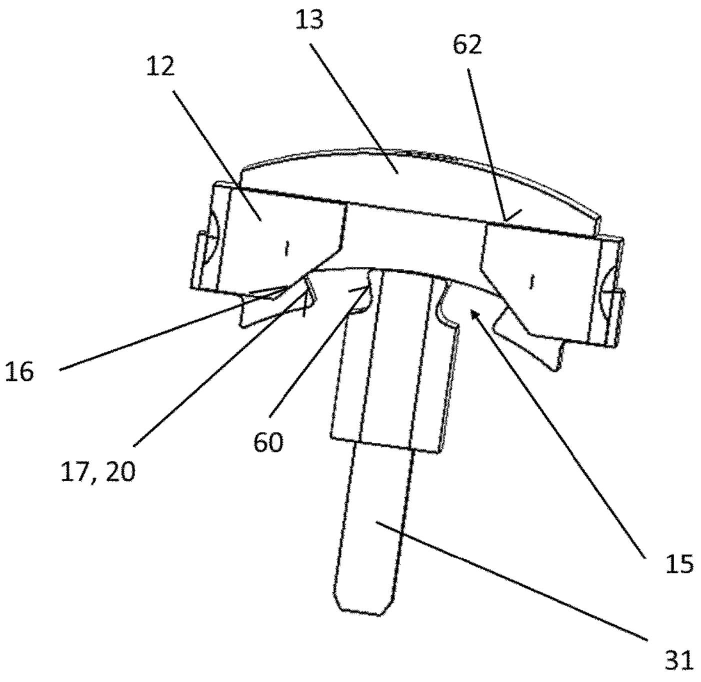
Figure 7:
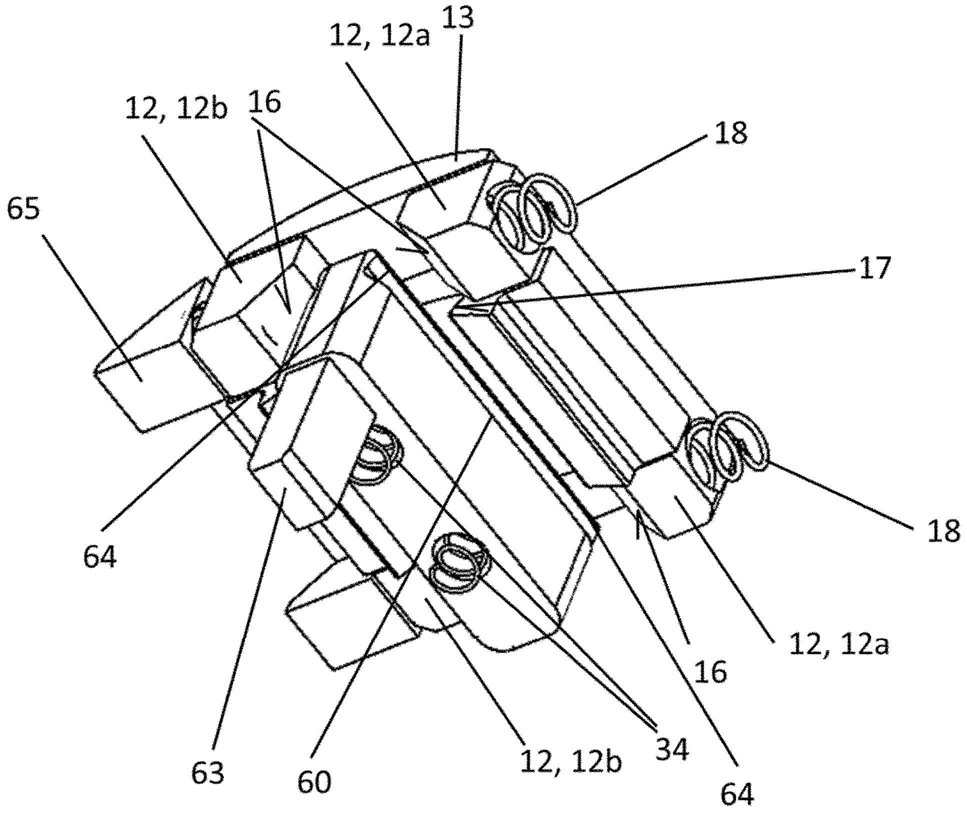

FIGS. 5 to 7 show selected elements of the installation device 1 from FIG. 4. FIG. 5 thereby shows the arrangement of the barrier element 31 in relation to the blocking element 51 and the stator insert element 13 together with stator elements 12.

The blocking element 51 is rotatable between a release position in which the recess 54 is located opposite the barrier element 31 such that the barrier element 31 can retract into the recess 54 and blocking positions in which the recess 54 is not located opposite the barrier element 31 such that the barrier element 31 is prevented from retracting into the recess 54. FIGS. 4 and 5 show blocking positions of the blocking element 51.

The barrier element 31 is designed with a contact section 63 facing the blocking element 51 to be able to retract into the recess 54 when the blocking element 51 is located in the release position and the recess 54 is located opposite the contact section 63 of the barrier element 31, i.e. points upwards in FIG. 5. This makes it possible for the barrier element 31 to move into the second position.

A first contact surface 16 of the stator elements 12 facing the barrier element 31 is designed such that the barrier element 31 is pushed in the direction of the blocking element 51 when the rotor 30 rotates further, i.e. into the second position in which the rotor 30 is freely rotatable with respect to the stator 10. The first contact surface 16 is designed as an inclined surface which pushes the barrier element 31 into the second position. The first contact surface can be straight, convex or concave here.

The stator elements 12 are movably mounted on the stator insert element 13 and the stator body 11 between a first position and a second position. The stator elements 12 are pushed into the first position by means of spring elements 18. The spring elements 18 are mounted in the stator 10. The movement of the stator elements 12 from the first position into the second position according to the movement direction 71 is perpendicular to the movement direction 70 of the barrier element 31 at the start of the movement.

During a process for unlocking the rotor 30 with respect to the stator 10, the barrier element 31 is initially located in the barrier element recess 15. The barrier element 31 is guided in the rotor 30 here. In addition, the barrier element 31 rests on the first contact surfaces 16 of the stator elements 12. This centers the barrier element 31. This position of the barrier element 31 is called the rest position. In the rest position, the barrier element 31 is preferably arranged spaced apart from the blocking element 51.

A user now wants to unbolt the door and inserts the key 200 into the key channel 36. This starts an electronic communication between the key 200 and the control device 53, which electronically determines whether the user is authorized.

If the user is authorized to unbolt the door, the control device 53 controls the actuator 52. The actuator 52, designed as an electric motor, rotates the blocking element 51 into the release position in which the recess 54 is located opposite the barrier element 31. If the rotor 30 is now started to rotate by means of the key 200, the barrier element 31 slides along one of the first contact surfaces 16 into the second position in which the barrier element 31 engages into the recess 54. The springs 34 are tensioned here. The barrier element 31 is moved in the movement direction 70.

Figure 8:
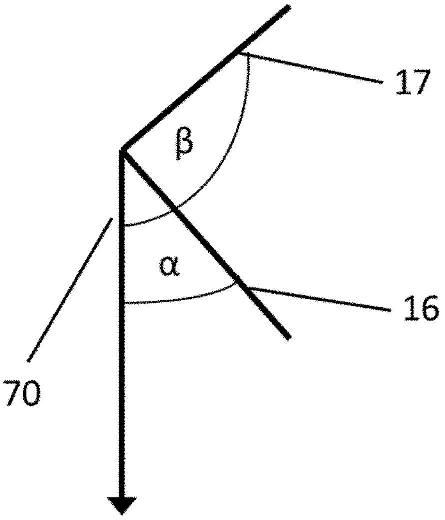

For this purpose, the first contact surfaces 16 form an acute angle α with the movement direction 70 of the barrier element 31 (see FIG. 8).

The stator elements 12 remain in the first position here. This is made possible by the fact that the spring elements 18 exert a greater force on the stator element 12, along which the barrier element 31 slides, than the springs 34 exert on the barrier element 31.

The rotor 30 can now rotate freely. The barrier element 31 slides along the first of the contact surfaces 16 into which the barrier element 31 is rotated. The barrier element 31 is surrounded by the first contact surfaces 16 in both directions of rotation such that the rotation in both directions when it rests on at least one of the first contact surfaces 16 causes the barrier element 31 to move into the second position. In order to provide first contact surfaces 16 in both directions of rotation, the barrier element recess 15 is surrounded on both sides by at least one first stator element 12, 12*a* and one second stator element 12, 12*b* (see FIG. 7).

It is provided according to the disclosure that the stator 10 has a second contact surface 17, which leaves the barrier element 31 in the first position. The second contact surface 17 is used functionally when the user is not authorized to unbolt the door. The second contact surfaces are formed in the stator insert element 13. If the barrier element 31 is located in the rest position, the second contact surfaces 17 are further away from the barrier element 31 than the first contact surfaces 16.

Preferably, the second contact surfaces 17 are also inclined, but opposite to the first contact surfaces 16 in relation to the movement direction 70 of the barrier element 31. The second contact surfaces 17 thus form an obtuse angle β to the movement direction 70 of the barrier element 31 (see FIG. 8).

At its end facing the stator insert element 13, the barrier element 31 has, as seen along the axis of rotation of the blocking element 51 and/or the rotor axis 35, a cross-section which has the shape of a preferably symmetrical trapezoid tapering in the direction of the blocking element 51. The legs of this trapezoid form head surfaces 60 on the outside in relation to the barrier element 31. The head surface 60 and the corresponding contact surface 17 are formed inclined to the movement direction of the barrier element 31.

If the user is not authorized to unbolt the door, the following procedure occurs. The barrier element 31 is initially located in the rest position. A key 200 without locking authorization is inserted into the key channel 36. The electronic data exchange shows that there is no authorization to unbolt the door. Therefore, the actuator 52 is not activated and the blocking element 51 remains in a blocking position in which the recess 54 is not located opposite the barrier element 31, as represented in FIGS. 4 and 5. Rather, an outer circumference of the blocking element 51 is located opposite the barrier element 31.

If the rotor 30 is rotated, the barrier element 31 tries to slide along the first contact surface 16. However, this is not possible because the barrier element 31 rests on an outer circumference of the barrier element 31. Thus, the barrier element 31 cannot be pushed into the second position against the force of the springs 34.

Instead, the stator element 12, which is located in the direction of rotation of the barrier element 31, is pushed back by the barrier element 31 against the force of the spring 18 until the barrier element 31 rests on the second contact surface 17. The stator element 12 is now located in the second position.

In this case, the head surface 60 of the barrier element 31 comes into contact with the corresponding second contact surface 17 located opposite one of the legs of the trapezoid.

In this state, the stator element 12 or the stator elements 12 have been moved back in the direction of rotation against the force of a spring element 18. The spring element 18 presses the stator element 12 against the barrier element 31 as the rotor 30 continues to rotate.

The contact surface 17 is designed in such manner that the contact surface 17 holds the barrier element 31 in the first position. Thus, the rotor 30 remains blocked by the barrier element 31, such that the door cannot be unbolted.

Every second contact surface 17 corresponds to a respective head surface 60 of the barrier element 31 facing it. The surface 60 and the respectively corresponding contact surface 17 are designed in such manner that the contact surface 17 is located between the surface 60 and the blocking element 51 when the barrier element 31 rests on the contact surface 17.

If an attempt is made to rotate the rotor 30 further, the barrier element 31 slides away from the blocking element 51 counter to the movement direction 70. This is achieved by the inclination of the second contact surface 17. The barrier element 31 can slide with the head surface 60 along the second contact surface 17. Thus, the barrier element 31 and the blocking element 51 can be spaced apart from each other when they rest on the second contact surface 17. Additionally or alternatively, the forces acting on the barrier element 31 during further attempted rotation of the rotor 30 are diverted into the second contact surface 17. This is helped by the fact that the head surfaces 60 correspond to the second contact surfaces and thus the barrier element 31 rests flat on the second contact surface.

This reduces the risk of damage to the blocking element 51.

In particular, this makes it possible to support the blocking element 51 on one side.

In FIG. 5, the barrier element recess is provided with the reference numeral 15. FIG. 6 shows the arrangement of FIG. 5 seen from one end of the barrier element 31, only without blocking element 51. Here, the stator elements 12 are located in the second position. FIG. 7 shows the same elements as FIG. 6 in a different perspective. In addition, FIG. 7 shows the spring elements 18 and on the left side a spring receptacle 65 of the stator 10 for receiving the spring elements 18, while the spring receptacle 65 on the right side is not represented.

The barrier element 31 is surrounded by the second contact surfaces 17 in both directions of rotation, such that the rotation in both directions when it rests on one of the second contact surfaces 17 leaves the barrier element 31 in the first position.

In the first position of the stator elements 12, the first contact surfaces 16 are located closer to the barrier element 31 than the second contact surfaces 17. In the second position of the stator elements, the second contact surfaces 17 protrude further into the barrier element recess 15 than the first contact surfaces 16.

The first and second contact surfaces 16, 17 are arranged axially one behind the other in the direction of the rotor axis 35. In the exemplary embodiment of the figures, for example, four first contact surfaces 16 are provided, with two first contact surfaces 16 being provided in each direction of rotation of the rotor 30. For this purpose, two first stator elements 12*a* are provided on one side of the barrier element recess 15 and two second stator elements 12*b* are provided on the other side of the barrier element recess 15.

FIG. 7 shows that two first contact surfaces 16 enclose a second contact surface 17 in the axial direction. This ensures that the barrier element 31 is pushed particularly evenly into the second position by the first contact surfaces 16.

The barrier element 31 extends in the axial direction in relation to the rotor axis 35 in such manner that the barrier element 31 can come into contact with both the first contact surface 16 and the second contact surface 17.

The barrier element 31 is formed in one piece. As a result, first contact sections 64 of the barrier element 31, which are used to engage the first contact surfaces 16, are rigidly connected to the head surfaces 60, which are used to contact the second contact surfaces 17. The head surfaces 60 serve as second contact sections. The first and second contact sections 60, 64 are rigidly connected to the third contact section 63 of the barrier element, which serves for contact in the recess 54. In a modification of the exemplary embodiment not represented, the first contact section 64 is adapted to the first contact surface 16, that is to say that the barrier element 31 in the first contact section 64 can be designed, for example, as a trapezoid widening in the direction of the blocking element 51. This allows the barrier element 31 to slide flat along the first contact surface 16.

The four stator elements 12, for example, are delimited on the outside during the movement between the first and the second position on one side by a guide surface 62 of the stator insert element 13. The stator elements 12 are delimited inwards by a guide surface of the stator body 11, not represented.

The assembly of the installation element 1 is facilitated by the stator comprising a stator body 11 and a stator insert element 13. The cover 14 serves to fasten the stator insert element 13 in the stator body 11.

The first rotor element 32 has a larger diameter than the second rotor element 33. The stator elements 12 and the stator insert body 13 are arranged in the section of the stator 10 that surrounds the second rotor element 33. Due to the small diameter of the second rotor element 33, it is possible to provide the first and second contact sections 16, 17 in the stator 10.

A circumferential projection 43 of the second rotor element 33, here as a collar, serves as a stop of the second rotor element 33 on the stator 10. The projection 43 is preferably formed in one piece with the second rotor element 33. As a result, the second rotor element 33 is fixed axially towards the front side 37.

During assembly, the first rotor element 32 can be inserted into the stator 10 from the front side 37. The first rotor element 32 is fixed axially to the driver 103 by an end surface 66 facing the second rotor element 33. Here, the end surface 66 rests on an inner structure of the stator 10, in particular of the stator body 11. The second rotor element 33 can be inserted from the base side 23 until the projection 43 rests on the base side 23. By connecting the two rotor elements 32, 33, the resulting rotor 30 is fixed axially to the front and rear.

A latching element 61 is provided which holds the rotor 30 in position with respect to the stator 10 (see FIG. 4). In this case, a rotation of the rotor 30 is inhibited by the latching element 61 in the stator in such manner that the barrier element 31 can assume the rest position. The latching element 61 is formed by means of a spring-loaded latching lug by way of example. That is to say that the rotor 30 can overcome the latching lug 61 when rotating such that the function of the rotor 30 is maintained.

An annular projection 22 is formed in particular by means of half-shell-like parts, whose inner surfaces 26 facing each other cooperate with the key 200 in the manner of a bayonet lock. The parts are inserted into a circumferential groove 45 of the first rotor element 32. Outwardly protruding projections 25 of the annular projection 22 fix the parts of the projection 22 in the stator body 11 in their relative position to one another and to the stator body 11. The annular projection 22 acts with the inserted key 200 preferably in a bayonet-like manner as a key removal lock.

The extension element 40 is angled in the example shown. In this case, a first part of the extension element 40, which is intended for interaction with the key 200, extends radially further outward than a second part of the extension element 40, which is intended for interaction with the coupling part 41. This allows the second part to be arranged more centrally in order to be able to push the coupling part 41 better.

The extension element 40 is designed to push the coupling part 41, but without being in form-fitting engagement with the coupling part 41. This allows the extension element 40 to be designed in a filigree manner.

The extension element 40 serves to return the blocking element 51 mechanically and/or magnetically from the release position to the blocking position. The extension element 40 can be moved back into a starting position when the key is removed. When the extension element moves into the starting position, a movement of the blocking element 51 into the blocking position can be caused or permitted. For example, a spring, not represented, can be tensioned during the movement of the blocking element 51 into the release position. When the key is inserted, the extension element 40 holds the blocking element 51 in the release position and allows the blocking element 51 to move back into the blocking position when the extension element 40 moves with the key 200 in the direction of the front side 37 when the key is removed.

Figure 9:
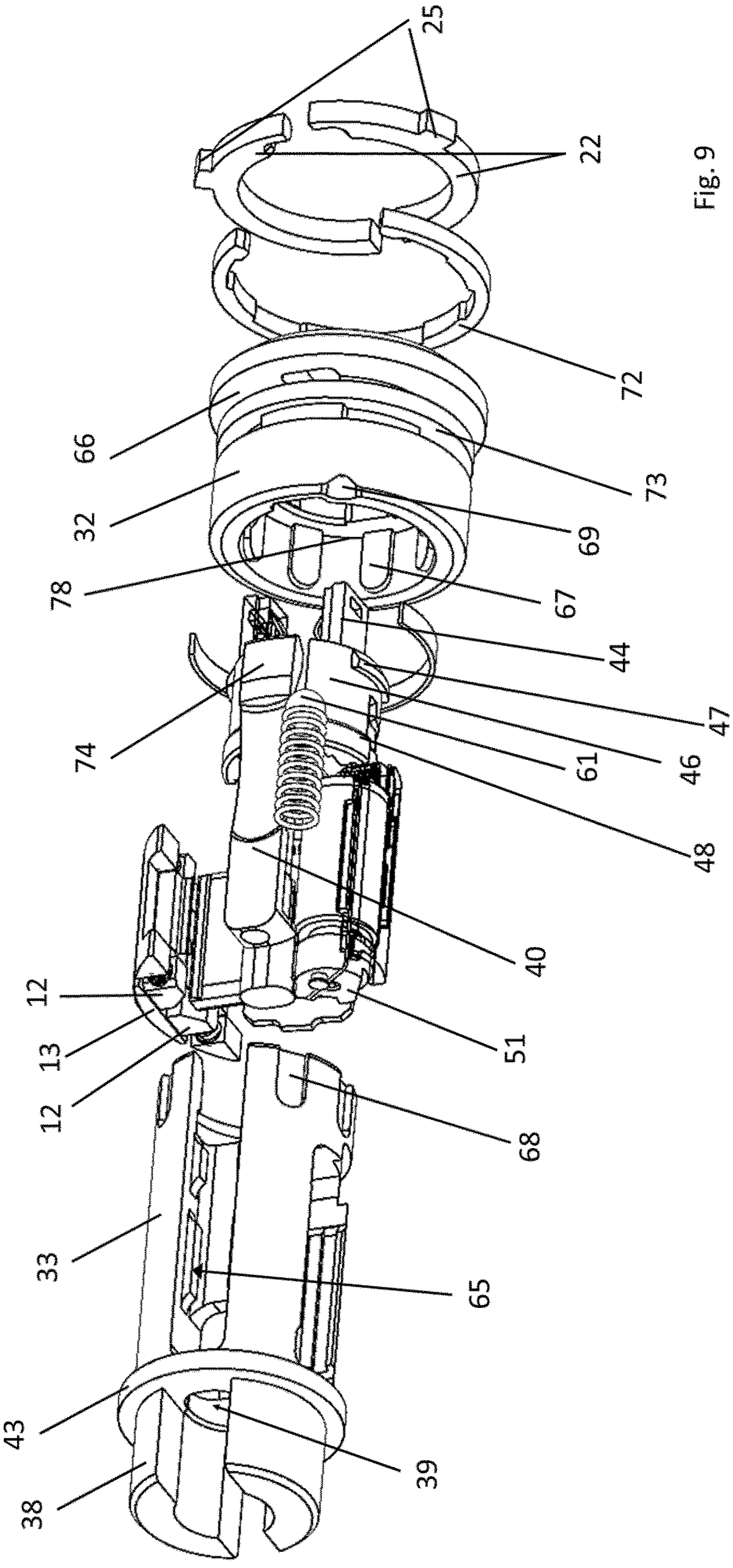

FIG. 9 shows a further exemplary embodiment of the barrier device according to the disclosure. FIG. 9 thereby shows a view corresponding to FIG. 4, i.e. the cover 14 and the stator body 11 are not represented. Only the differences to the first exemplary embodiment of FIGS. 1 to 8 are discussed below.

Instead of the screw 24, the first rotor element 32 comprises fastening means 67 and the second rotor element 33 comprises corresponding fastening means 68, which engage in a form-fitting manner such that the first rotor element 32 and the second rotor element 33 are fastened to one another in a rotationally fixed manner. Here, the first and second fastening means 67, 68 are designed as projections and corresponding recesses.

Instead of the coil as a transmission device 44, contact elements are provided as the transmission device 44 which transmit data and/or electrical energy to the barrier device 1 via an electrical contact with the key 200. The contact elements 44 are fastened resiliently on a housing 46.

The housing 46 also serves to axially fasten the rotor elements 32, 33 to one another. For this purpose, the housing 46 comprises a first latching element 47 which latches into the first rotor element 32. For this purpose, the first rotor element 32 comprises an edge 78. The housing 46 comprises a second latching element 48 which latches into the second rotor element 33. For this purpose, the second rotor element 33 comprises a groove, not represented.

The first rotor element 32 is fixed axially by a snap ring 72, in both directions along the axis of rotation. The snap ring 72 is arranged in a groove 73 of the first rotor element 33.

The latching element 61, designed here as a ball, is arranged in the stator 10 and engages into a recess 69 of the first rotor element 32.

The installation device 1 can also be used in other locking devices, for example in a half cylinder, a knob cylinder, a furniture cylinder or a padlock.

It is conceivable that the coupling part 41 is missing. Rather, locking devices according to the disclosure can be provided in which the driver 103 is rigidly fastened to the rotor 30. The driver 103 can also serve as a bolt itself, e.g. in a furniture lock. The driver 103 and the insert 105 can be formed integrally with each other.

The stator insert element 13 and the stator body 11 can be formed in one piece. It is also conceivable that the cover 14 is missing and the stator body is fastened directly in the locking device housing 101.

In a further alternative of the disclosure, the barrier device 1 is not designed as an installation device 1. Rather, the stator 10 is designed as a locking device housing 101. Thus, the rotor 30 can be designed to be inserted directly into a locking cylinder housing 101. The locking device housing 101 then assumes the function of the stator 10.

The barrier element 31 can also be mounted in the stator 10 such that it is pressed against the rotor 30. In this case, the first and second contact surfaces 16, 17 are formed in the rotor.

In the exemplary embodiment of the figures, the contact surfaces 16, 17 are designed such that the first contact surfaces 16 or the second contact surfaces 17 enclose the second contact surfaces 17 or the first contact surfaces 16. However, they can also be arranged differently in relation to each other.

The transmission device 44 can be designed in the first exemplary embodiment as a contact element for electrically contacting the key or in the second exemplary embodiment by contactless coils.

In the first exemplary embodiment, the fastening can be carried out by latching means as in the second exemplary embodiment.

It may be that the actuator moves the blocking element back into the blocking position. This can be provided in particular for knob cylinders.

The blocking element 51 can alternatively be designed in the shape of a plunger. In this case, a preferably bistable magnet is used as the actuator. The plunger can be spring-loaded in one direction, preferably away from the magnet.

The rotor 30 does not have to have a plurality of rotor elements 32, 33. Nevertheless, the rotor 30 can have sections with different diameters.

The design of the disclosure is not restricted to the preferred exemplary embodiment indicated above. In fact, a number of variants is conceivable which make use of the represented solution even in the case of fundamentally different designs. All features and/or advantages emerging from the claims, the description or the drawings, including constructive details or spatial arrangements, may be essential to the disclosure even in the most varied combinations.

The invention claimed is:

1. An electromechanical barrier device for a closure element or for a switching element with a stator and with a rotor as components, wherein the rotor is mounted in the stator, and with a barrier element, wherein the barrier element is mounted in a first component of the components, wherein the barrier element is configured to be movable between a first position and a second position, wherein the barrier element in the first position engages in a second component of the components, wherein the barrier element is disengaged from the second component in the second position, wherein the second component has a first contact surface for the barrier element, wherein the first contact surface moves the barrier element from the first position into the second position when the rotor rotates, wherein the second component has a second contact surface for the barrier element, wherein the second contact surface leaves the barrier element in the first position, wherein the second component comprises a component element, wherein the component element has the first contact surface and the component element is movably mounted in the remaining second component, wherein the component element is moved between the first position and the second position, wherein in the first position the first contact surface rests on the barrier element in such manner that when the rotor rotates, the barrier element is configured to be movable from the first position into the second position, wherein in the second position the barrier element rests on the second contact surface in such manner that the barrier element remains in the first position, wherein the second component comprises at least one spring element, wherein the spring element pushes the component element into the first position, wherein the spring element is mounted in the second component.

2. The barrier device according to claim 1, wherein the component element and the barrier element move relative to one another when the rotor rotates.

3. The barrier device according to claim 1, wherein the movement of the component element between the first position and the second position comprises a perpendicular component to the movement of the barrier element between the first position and the second position, wherein the movement of the component element takes place perpendicular to the movement of the barrier element.

4. The barrier device according to claim 1, wherein the barrier element is pretensioned into the first position by a spring, wherein the force acting on the barrier element through the spring is smaller than the force acting on the component element through the spring element.

5. The barrier device according to claim 1, wherein the first component is designed as the rotor and the second component as the stator, wherein the component element is designed as a stator element, wherein the component element does not rotate when the rotor rotates.

6. The barrier device according to claim 5, wherein the stator comprises a stator body and/or a stator insert element, wherein the stator insert element comprises a guide surface for the stator element.

7. The barrier device according to claim 5, wherein the stator comprises a stator body and a stator insert element, wherein the stator insert element comprises the second contact surface, wherein the stator body comprises a stator recess accessible from the outer circumference, in which the stator insert element is inserted.

8. The barrier device according to claim 5, wherein the rotor comprises at least one first axial section and a second axial section, wherein the second section comprises a smaller diameter than the first section, wherein the barrier element is arranged in the second section.

9. The barrier device according to claim 1, wherein the first contact surface and the second contact surface are arranged axially one behind the other in relation to the rotor axis, wherein the first contact surface axially encloses the second contact surface.

10. The barrier device according to claim 1, wherein the barrier element is formed in one piece and/or wherein the barrier element comprises a first contact section for contacting the first contact surface and a second contact section for contacting the second contact surface, wherein the first contact section and the second contact section are rigidly connected to each other.

11. The barrier device according to claim 1, wherein the barrier device comprises a blocking element, wherein the blocking element in a release position allows the movement of the barrier element from the first position into the second position and in a blocking position prevents the movement of the barrier element from the first position into the second position, wherein the second contact surface is designed in such manner that the barrier element is spaced apart from the blocking element by the contact with the second contact surface, wherein forces acting from the barrier element on the blocking element are diverted on one side.

12. The barrier device according to claim 11, wherein the barrier element comprises a third contact section for contacting the blocking element, wherein the third contact section is rigidly connected to the first contact section and/or the second contact section.

13. A locking device with a barrier device designed as an installation device according to claim 1.

* * * * *